Figure 1:
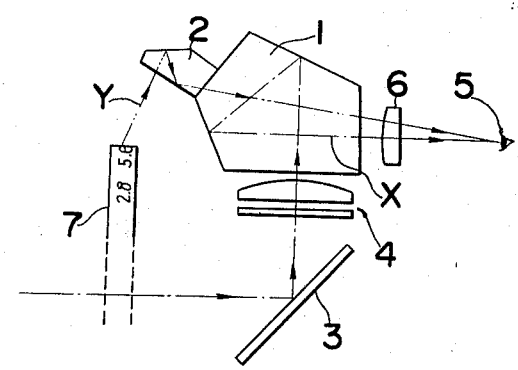

United States Patent [19]
Uchida

[11] 3,800,655
[45] Apr. 2, 1974

[54] PHOTOGRAPHIC VIEWFINDER ARRANGEMENT

[75] Inventor: Isamu Uchida, Osaka, Japan

[73] Assignee: Minolta Camera Kabushiki Kaisha, Osaka-fu, Japan

[22] Filed: Dec. 14, 1972

[21] Appl. No.: 315,220

[30] Foreign Application Priority Data
Dec. 20, 1971 Japan............................ 46-121020

[52] U.S. Cl.................... 88/1.5 R, 95/11 V, 95/42
[51] Int. Cl. ........................................... G03b 13/02
[58] Field of Search............. 88/1.5 R; 95/11 V, 42, 95/44 R

[56] References Cited
UNITED STATES PATENTS

| | | |
|---|---|---|
| 3,675,558 | 7/1972 | Kuramoto et al............... 95/11 V X |
| 3,094,911 | 6/1963 | Reiche et al. ................ 88/1.5 R UX |
| 3,524,380 | 8/1970 | Yamada et al..................... 88/1.5 R |
| 3,687,038 | 8/1972 | Kawakami ............................. 95/42 |

*Primary Examiner*—Ronald L. Wibert
*Assistant Examiner*—F. L. Evans
*Attorney, Agent, or Firm*—Wenderoth, Lind & Ponack

[57] ABSTRACT

A viewfinder arrangement which comprises a pentagonal prism, an auxiliary prism cemented to the pentagonal prism, a reflective element for reflecting images of the adjusting scales towards the auxiliary prism whereby the length of the optical path from the adjusting scale on the camera lens barrel to the eye of a photographer through the auxiliary prism and the pentagonal prism by means of the reflective element is made longer than the length of the optical path from the camera focusing plate to the photographer's eye, and an optical element for compensating for the difference between these two optical paths. The auxiliary prism has an additional entrance for transmitting a beam of light carrying a shutter speed information to the eye of the photographer.

7 Claims, 7 Drawing Figures

PHOTOGRAPHIC VIEWFINDER ARRANGEMENT

The present invention relates to an image projecting viewfinder arrangement for use in a photographic camera of the type having a pentagonal prism and, more particularly, to the image projecting viewfinder arrangement capable of projecting into the image of the viewfinder indicating marks, such as diaphragm aperture, exposure time or shutter speed and/or distance, necessary to set the camera in proper exposure conditions or like marks.

Methods of projecting the exposure adjusting scales into the image of the viewfinder are generally of two kinds, one of which is a mechanical system utilizing mechanical linkages between a shutter ring, focusing ring and diaphragm aperture adjusting ring and their associated movable pointer needles operatively housed in the camera body in the neighbourhood of the prism so as to be projected in the viewfinder image, and the other of which is an optical system utilizing an auxiliary prism cemented to the viewfinder prism so as to project the adjusting scales into the viewfinder image. The present invention pertains to the second of these methods.

However, one typical device heretofore largely employed and utilizing the second of the abovementioned methods is found to have the following disadvantage which will be hereinafter described with reference to FIGS. 1 and 2 of the accompanying drawings forming a part of this specification.

Figure 2:
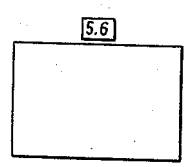

In FIGS. 1 and 2, the optical arrangement of the conventional viewfinder arrangement and a pictorial representation observable by a photographer observing into the eye-piece of the viewfinder are respectively schematically illustrated, wherein reference numerals 1 and 2 designate the prism and the auxiliary prism. In this arrangement, an image of the object to be photographed, after having been reflected by a hingedly mounted mirror 3 in a known manner, is usually focused on a focusing plate 4 which is in turn transmitted to the eye 5 of the photographer through the prism 1 and an ocular 6, the focused image on the focusing plate 4 being referred to as a viewfinder image. The optical path of travel of the viewfinder image from the plate 4 to the eye 5 is schematically illustrated by X. The auxiliary prism 2 is cemented to the prism 1 such as to transmit particular figures on the exposure time setting ring, diaphragm aperture adjusting ring and/or focusing ring, only the diaphragm aperture adjusting ring being shown in FIG. 1 by 7, to the eye 5 through the auxiliary prism 2, the prism 1 and the ocular 6. The path of travel of the image of the particular figure on the diaphragm aperture adjusting ring 7 is schematically illustrated by Y.

In order that the image of the figure on the diaphragm aperture adjusting ring 7 as well as the viewfinder image on the focusing plate 4 are both sharply viewed by the eye 5 of the photographer, the lengths of the optical paths X and Y must be the same. Because of such arrangement, the image of the figure on the adjusting ring 7 appears to the eye 5 in a unnecessarily large size relative to the size of the viewfinder image which is also appearing to the eye 5, substantially as shown in FIG. 2.

Representation of the images of the adjusting scales within the viewfinder in a large size relative to the size of the viewfinder image is disadvantageous in that the photographer will be obstructed in shooting the object to be photographed particularly after the camera has been set in the particular exposure conditions.

The conventional device of the above construction has another disadvantage in that the type of cameras to which it is applicable is limited. In other words, since the auxiliary prism 2 is designed such as to transmit the images of the particular figures on the various adjustment rings operatively carried by a lens barrel forwardly projecting from the body of a camera, the arrangment of FIG. 1 can not be applicable to a camera of the focal plane shutter type wherein an exposure time setting dial is provided on the side of the camera body.

Accordingly, an essential object of the present invention is to provide an improved viewfinder arrangement substantially eliminating the above mentioned disadvantages inherent in the conventional viewfinder arrangement of the above mentioned construction.

Another important object of the present invention is to provide an improved viewfinder arrangement with which representation of the images of the indicating marks is obtainable within the viewfinder in a properly reduced size relative to the size of the viewfinder image concurrently represented within the viewfinder.

A further object of the present invention is to provide an improved viewfinder arrangement of the above mentioned type which can be utilized either in a camera of built-in-lens shutter type or in a camera of focal plane shutter type.

According to one preferred embodiment of the present invention, the viewfinder arrangement essentially comprises a main prism rigidly carried by the camera body with the bottom surface thereof situated in the vicinity of and immediately above the focusing plate on which an image of the object to be photographed is focused, an auxiliary prism cemented to said main prism and seating on a surface of said main prism which does not contribute to the formation of the viewfinder image and a reflective element disposed above the camera lens barrel for reflecting images of the indicating marks towards the auxiliary prism whereby the length of the optical path from the indicating marks on the camera lens barrel to the eye of the photographer through the auxiliary prism and the main prism by means of the reflective element is made longer than the length of the optical path from the focusing plate to the eye of the photographer. For compensating for the difference between these two lengths of the optical paths, a concave lens is disposed on the first mentioned optical path between the adjusting scales on the camera lens barrel and the reflective element. The auxiliary prism does not only have an entrance surface for the first mentioned optical path, but also has an additional entrance surface for a third optical path along which a beam of light carrying an image of one particular figure representative of the setting of the exposure time setting dial after having passed through a slidable strip member mechanically coupled to the exposure time setting dial and bearing a plurality of transparent figures representative of shutter speeds, is transmitted to the eye of the photographer through the auxiliary prism and the main prism. If the length of this third optical path is either greater or smaller than the length of the second mentioned optical path, a concave lens or convex lens may be employed, respectively.

In another preferred embodiment of the present invention, the auxiliary prism has a single entrance surface common to the first and third mentioned optical paths.

Figure 5:
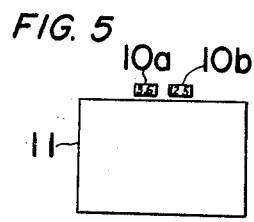
Figure 3:
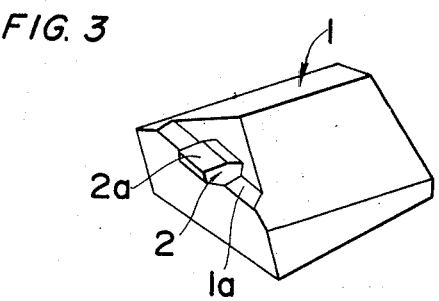
Figure 6:
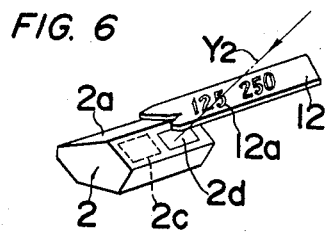
Figure 4:
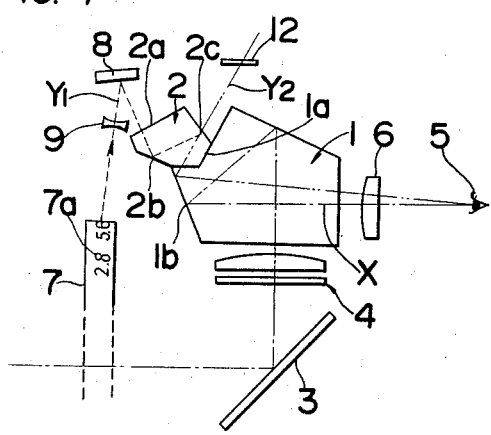
Figure 7:
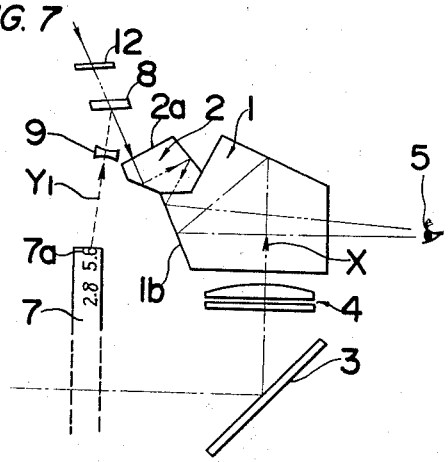

In any event, these and other objects and features of the present invention will become apparent from the following description taken in conjunction with preferred embodiments with reference to the accompanying drawings, in which;

FIG. 1 is a schematic diagram of the prior art viewfinder arrangement,

FIG. 2 is a schematic diagram showing the pictorial representation of the viewfinder image, reference to these drawings being already made in the foregoing description, FIG. 3 is a schematic perspective view of a main prism cemented with an auxiliary prism, employed in the viewfinder arrangement according to the present invention, FIG. 4 is a schematic diagram of one embodiment of the viewfinder arrangement of the present invention showing various optical paths, FIG. 5 is a schematic diagram showing a pictorial representation of the viewfinder image obtainable from the arrangement of FIG. 4, FIG. 6 is a schematic perspective view of the auxiliary prism showing a manner to receive a beam of light passing through a slidable strip member, and FIG. 7 is a similar diagram to FIG. 4, but showing another preferred embodiment of the present invention.

Before the description of the present invention proceeds, it should be noted that like parts shown in FIGS. 1 and 2 and the other drawings are designated by like reference numerals employed in FIGS. 1 and 2. It is also to be noted that, in either of the preferred embodiments of the present invention shown in FIGS. 3 to 6 and FIG. 7, the present invention will be described as applied in a photographic camera of the focal plane shutter type wherein the diaphragm aperture adjusting ring 7 and a focusing ring (not shown) are rotatably carried in any known manner on the lens barrel (not shown) forwardly projecting from the body of the photographic camera while the shutter speed selector dial is provided on the side of the camera body.

Referring first to FIGS. 3 to 6, the main prism 1 is formed at an upper portion of the front thereof with a substantially V-shaped seat 1a to which the auxiliary prism 2 is cemented in any known manner so as to project frontwardly of said main prism 1. A beam of light carrying an image of a selected one of figures representative of values of the diaphragm aperture, which are imprinted or otherwise suitably carried by the diaphragm aperture adjusting ring 7, is reflected by a reflective element 8 disposed above the camera lens barrel or the auxiliary prism 2 so as to permit the beam of light, after having been reflected by the reflective element 8, to be oriented towards an entrance surface 2a of the auxiliary prism 2. The beam of light entering the entrance surface 2a is twice reflected by surfaces of the auxiliary prism 2 such as indicated by 2b and 2c and, after having entered through the cemented area between the auxiliary prism 2 and the main prism 1, reflected by a front lower surface 1b of the main prism 1 on to the eye 5 via the ocular 6. The optical path of travel of the beam of light carrying the image of the selected one of the diaphragm aperture figures from the adjusting ring 7 to the eye 5 is designed to permit the image of the selected figure to appear in a first field of view 10a located outside a main field of view 11 in which the image of the object to be photographed can appear.

The reflective element 8 is disposed such that the length of the optical path, as indicated by the dotted line $Y_1$, of the beam of light carrying the image of the selected one of the diaphragm aperture figures on the adjusting ring 7 becomes greater than the length of the optical path X by at least twice the length of the optical path between the reflective element 8 and the first reflective surface 2b of the auxiliary prism 2. In order to compensate for the difference between the lengths of these optical paths $Y_1$ and X, a concave lens 9 is disposed on the optical path between the adjusting ring 7 and the reflective element 8 whereby the image of the selected figure on the adjusting ring 7 and the viewfinder image are both sharply projected to the eye 5 through the ocular 6 with the image of the selected figure appearing in the field of view 10a in a reduced size as shown in FIG. 5.

The auxiliary prism 2 has an additional or second entrance surface 2d formed in the neighborhood of the second reflective surface 2c as shown in FIG. 6.

A slidable strip member 12 bearing a plurality of FIGS. 12a representative of the shutter speeds, which are perforated or otherwise made transparent, and mechanically coupled to an exposure time setting dial or shutter speed selector dial (not shown) on the side of the camera body is slidably disposed above the second entrance surface 2d of the auxiliary prism 2 whereby, once the shutter speed selector dial is turned to select a particular shutter speed, one of the FIGS. 12a of the slidable strip member 12 which corresponds to the selected shutter speed can be brought into register with the second entrance surface 2d.

A beam of light, as indicated by the double chain line $Y_2$, which carries an image of the selected FIG. 12a after having passed through the strip member 12, enters the second entrance surface 2d of the auxiliary prism 2, which is in turn transmitted to the surface 1b of the main prism 1 and reflected thereby on to the eye 5 through the ocular 6. It is to be noted that the beam of light $Y_2$ after having entered the entrance surface 2d runs parallel to the optical path $Y_1$. Usually, the length of the optical path $Y_2$ between the strip member 12 and the ocular 6 is, by some reason, smaller than that of the optical path X between the focusing plate 4 and the ocular 6. The use of a convex lens (not shown) is recommended in which case said convex lens may be disposed on the optical path between the strip member 12 and the entrance surface 2d. Alternatively, the convex lens may be cemented to said entrance surface 2d. The image of the selected FIG. 12a concerning the shutter speed is preferably designed so as to appear in a second field of view 10b located outside the field of view 11 and in the vicinity of the first field of view 10a in the same or similar size to the image appearing in the field of view 10a.

In the second preferred embodiment of the present invention shown in FIG. 7, the strip member 12 is disposed above the plane of the reflective element 8 while the second entrance surface, which has been described as provided at 2d in the foregoing embodiment, is formed in the neighborhood of the first entrance surface 2a of the auxiliary prism 2. Even in this arrangement, it is readily understood that the same representation as shown in FIG. 5 can be observable through the eye-piece of the camera body into which the photographer looks. It is to be noted that, in the second preferred embodiment, the reflective element 8 if it is of a relatively large size may be made partially transparent to permit the passage of the beam of light carrying the image of the selected FIG. 12a on to the first reflective surface 2b through the second entrance surface. It is to be noted that the second entrance surface in the embodiment of FIG. 7 may be the same as the first entrance surface 2a, provided that the surface area of the first entrance surface 2a is sufficient to accommodate the different optical paths.

In either of these embodiments of the present invention, the employment of the reflective element 8, which may be a mirror, has an additional advantage in that, during the manufacture of different types of photographic cameras such utilizing the same design of the viewfinder arrangement, the difference of optical paths $Y_1$ among the different types of cameras can be compensated for by properly positioning the reflective element 8. Furthermore, since the substantially V-shaped seat 1a is provided in the main prism 1, correct positioning of the auxiliary prism 2 with respect to the main prism 1 can be advantageously appreciated.

Although the present invention has been fully disclosed by way of example of the preferred embodiments, it is to be noted that various changes and modifications are apparent to those skilled in the art. Unless these changes and modifications depart from the scope of the present invention, they should be construed as included within the scope of the present invention. For example, the concave lens 9 may be alternatively disposed between the reflective element 8 and the entrance surface 2a of the auxiliary prism 2.

What is claimed is:

1. A viewfinder arrangement for a single lens reflex camera which comprises in combination:
   a focusing screen;
   an eyepiece;
   a pentagonal prism positioned to direct a beam of light passing through said focusing screen into said eyepiece;
   an auxiliary prism mounted on said pentagonal prism for directing a further beam of light entering said auxiliary prism into said eyepiece by means of reflection by a front lower reflection plane of said pentagonal prism;
   an exposure condition adjusting member having a scale and operatively positioned;
   a reflecting member operatively located for directing an image of said scale of said exposure condition adjusting member to said auxiliary prism; and
   a concave lens operatively positioned for substantially equalizing the optical distance from said scale of said exposure condition adjusting member to said eyepiece with the optical distance from said focusing screen to said eyepiece.

2. A viewfinder arrangement as claimed in claim 1, wherein said exposure condition adjusting member comprises a focal distance adjusting member and a diaphragm setting member and wherein said reflecting member carries an image of said exposure condition adjusting member.

3. A viewfinder arrangement as claimed in claim 1, wherein said pentagonal prism has a front upper non-reflecting plane with a substantially V-shaped seat therein to which said auxiliary prism is firmly mounted to fit with said substantially V-shaped seat.

4. A viewfinder arrangement as claimed in claim 1, wherein said auxiliary prism has an incident plane facing at least one indicium indicative of a selected value of said exposure condition adjusting member and permitting the entry said further beam of light, said further beam of light entering said auxiliary prism being directed into said eyepiece through the reflection by said front lower reflection plane of said pentagonal prism.

5. A viewfinder arrangement as claimed in claim 1, wherein said auxiliary prism has at least two reflection planes and said beam of light entering said auxiliary prism being carried to a front lower reflecting plane of said pentagonal prism after having been reflected by each of said two reflection planes of said auxiliary prism.

6. A viewfinder arrangement as claimed in claim 1, wherein said concave lens is disposed between said exposure condition adjusting member and said reflecting member.

7. A viewfinder arrangement as claimed in claim 1, wherein said concave lens is disposed between said reflecting member and said auxiliary prism.

* * * * *